United States Patent
Mattsson et al.

(10) Patent No.: US 9,639,569 B2
(45) Date of Patent: *May 2, 2017

(54) MAPPING BETWEEN TOKENIZATION DOMAINS

(71) Applicant: Protegrity Corporation, Grand Cayman (KY)

(72) Inventors: Ulf Mattsson, Cos Cob, CT (US);
Yigal Rozenberg, Wilton, CT (US);
Vichai Levy, Norwalk, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,253

(22) Filed: Dec. 1, 2015

(65) Prior Publication Data

US 2016/0092486 A1    Mar. 31, 2016

Related U.S. Application Data

(63) Continuation of application No. 14/042,320, filed on Sep. 30, 2013, now Pat. No. 9,229,987.

(51) Int. Cl.
| | | |
|---|---|---|
| *G06F 17/30* | (2006.01) | |
| *G06F 7/00* | (2006.01) | |
| *H04L 29/06* | (2006.01) | |
| *H04L 9/32* | (2006.01) | |

(52) U.S. Cl.
CPC .. *G06F 17/30345* (2013.01); *G06F 17/30477* (2013.01); *G06F 17/30528* (2013.01); *H04L 9/3213* (2013.01); *H04L 63/00* (2013.01)

(58) Field of Classification Search
CPC .................... G06F 17/30528; H04L 63/00
See application file for complete search history.

(56) References Cited

U.S. PATENT DOCUMENTS

| | | |
|---|---|---|
| 9,152,910 B2 | 10/2015 | Kuo et al. |
| 2006/0036593 A1 | 2/2006 | Dean et al. |
| 2007/0220023 A1 | 9/2007 | Dean et al. |
| 2010/0050251 A1 | 2/2010 | Speyer et al. |
| 2011/0126274 A1 | 5/2011 | Sadeckas |
| 2011/0154467 A1 | 6/2011 | Bomar et al. |
| 2011/0213807 A1 | 9/2011 | Mattsson |
| 2012/0173563 A1 | 7/2012 | Griffin et al. |
| 2012/0291114 A1 | 11/2012 | Poliashenko et al. |
| 2013/0047245 A1 | 2/2013 | Radhakrishnan |

(Continued)

OTHER PUBLICATIONS

United States Office Action, U.S. Appl. No. 14/042,320, Jul. 28, 2015, 8 pages.

*Primary Examiner* — Jeffrey A Burke
(74) *Attorney, Agent, or Firm* — Fenwick & West LLP

(57) ABSTRACT

A tokenization environment includes a first tokenization system in a first token domain and a second tokenization system in a second token domain. A token mapper accesses a first token from the first tokenization system and maps it to a second token from the second tokenization system. The first token can be a single-use or SLT token mapped to a clear text value within a single-use token table in the first tokenization system. The token mapper can identify the clear text value, and can query a multi-use token table in the second tokenization system with the clear text value to identify a multi-use token (the second token) mapped to the same clear text value. The token mapper can store the association between the first token and the second token in a token map.

20 Claims, 3 Drawing Sheets

(56) References Cited

U.S. PATENT DOCUMENTS

| | | |
|---|---|---|
| 2013/0198851 A1 | 8/2013 | Spies et al. |
| 2013/0212666 A1 | 8/2013 | Mattsson et al. |
| 2013/0283362 A1 | 10/2013 | Kress et al. |
| 2014/0013452 A1 | 1/2014 | Aissi et al. |
| 2014/0101774 A1 | 4/2014 | Armington et al. |
| 2014/0130145 A1 | 5/2014 | Yeleswarapu et al. |
| 2014/0279853 A1 | 9/2014 | Grondin et al. |

MAPPING BETWEEN TOKENIZATION DOMAINS

CROSS REFERENCE TO RELATED APPLICATIONS

This application is a continuation of U.S. application Ser. No. 14/042,320, filed Sep. 30, 2013, now U.S. Pat. No. 9,229,987, which is incorporated by reference in its entirety.

FIELD OF ART

This application relates to the field of data protection, and more specifically to the protection of information using tokenization.

BACKGROUND

Many websites, services, and applications implement data protection techniques. Certain techniques involve the use of an encryption key or password that can be subject to interception or brute force guessing. Other methods may protect data but require extensive computing resources to encode and decode data. Temporary or use-limited data protection can increase security by limiting how often a particular data protection technique can be implemented. Long-term or permanent data protection techniques can offer reliability and allow for the ability to subsequently analyze the use of such data protection techniques. Thus, it may be advantageous to implement data protection techniques that offer the benefits of both temporary or use-limited data protection and the benefits of long-term or permanent data protection while avoiding the hazards of encryption key/password interception or guessing.

SUMMARY

Tokenization operations can be performed in a variety of token domains. One such domain is a single-use token domain. Tokenization in a single-use domain includes the generation of a token for one-time use to replace a portion of sensitive data to create tokenized data. In subsequent tokenization operations for the same sensitive data, additional single-use tokens are generated for the replacement of the portion of the sensitive data. Another token domain is a multi-use token domain. Tokenization in a multi-use domain includes the generation of a token for replacing a portion of sensitive data any time the sensitive data is tokenized.

In order to manage tokenization across different token domains, a token mapper is used to associate tokens from the single-use domain with a token from the multi-use domain. The token mapper can receive a single-use token from a single-use token table, and can access a multi-use token from a multi-use token table mapped to a same clear text value within the multi-use token table as the single-use token within the single-use token table. In one embodiment, the token mapper can identify the clear text value to which the single-use token is mapped, and can query the multi-use token table using the clear text value to identify a multi-use token mapped to the clear text value. Alternatively, the token mapper can provide a single-use token to an external security system configured to access a multi-use token from a multi-use token table based on the single-use token, and the external security system can provide the multi-use token to the token mapper for association with the single-use token. It should be noted that although reference is made herein to single-use and multi-use domains, the principles described herein apply equally to mappings between any token domains.

The token mapper can store associations between single-use tokens and multi-use tokens in a token map. In one embodiment, the token mapper can identify multiple single-use tokens all mapped to the same clear text value within one or more single-use token tables, and can map each of the identified single-use tokens to a multi-use token mapped to the same clear text value in a multi-use token table. In order to improve security, the token mapper can delete the clear text value associated with single-use tokens or multi-use tokens mapped by the token mapper after a multi-use token table is queried, or after the association between a single-use token and a multi-use token is stored. In addition, the token mapper can encrypt or further tokenize the single-use tokens, the multi-use tokens, or the associations between the two stored by the token mapper.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
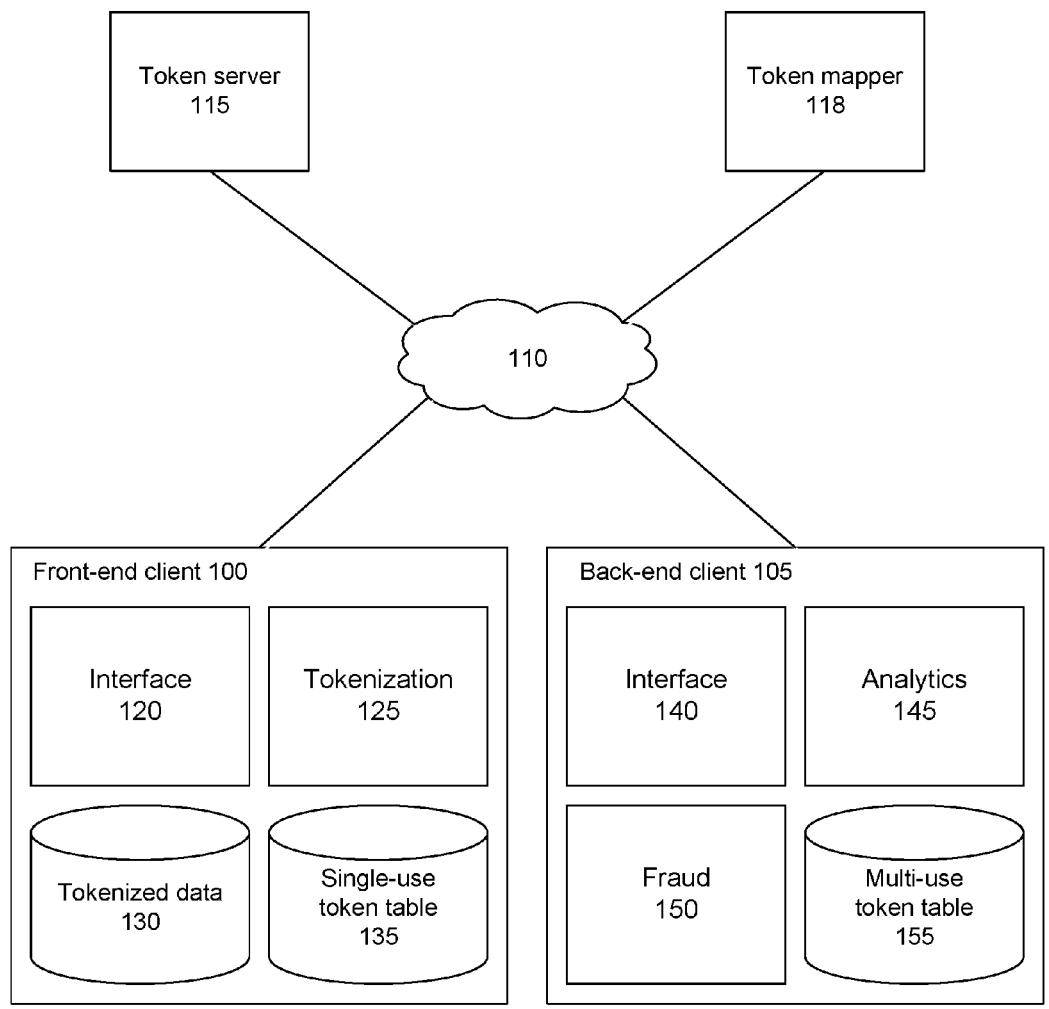
FIG. 1 is a system diagram for a tokenization environment, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Tokenization Overview

The transmission and storage of sensitive data, such as passwords, credit card numbers, social security numbers, bank account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column, for example for use in subsequent tokenization operations.

In some embodiments, to increase the security of tokenization, sensitive data can be tokenized two or more times using the same or additional token tables. This process is referred to as tokenization "chaining". For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token value is generated and included in a token table entry each time sensitive data is tokenized. The new token value can be generated randomly, can be randomly selected from among a set of values, or can be generated via any other suitable means. A seed value can be used to generate token values, to select a set of values from which to select a token value from among multiple sets of values, or to randomly select a value from among a set of values for use as the token value. It should be noted that as used herein, "randomly" can refer to pseudo-randomly or substantially randomly. The seed value can include a portion of data being tokenized.

As used herein, an SLT token is referred to as a "multi-use" or "permanent" token. A multi-use/permanent token refers to a token mapped to a static value (or a value that otherwise does not change over time) within a token table. As used herein, a DLT token is referred to as a "single-use" or "temporary" token. A single-use/temporary token refers to a token mapped to a value temporarily, or mapped to a value subject to change in the future. In other words, single-use tokens are generated and used for limited periods of time, while multi-use tokens are generated for extended periods of time or for permanent use. It should be noted that in other embodiments, other types of single-use and multi-use tokens can be used according to the principles described herein, though the remainder of the description will be limited to SLT tokens and DLT tokens for the purposes of simplicity. It should also be noted that although reference is made to "single-use" tokens throughout this description, limited-use tokens (for example tokens that are used two or three times in tokenization operations) can be implemented in place of single-use tokens according the principles described herein. A "token domain" as used herein refers to an environment in which one or more systems within the environment are configured to use only one type of token in tokenization (such as single-use tokens or multi-use tokens). It should be emphasized that other tokenization domains not described further herein can be used according to the principles described herein.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

The detokenization of data refers to an operation performed to convert tokenized data into the data on which tokenization was performed. To detokenize data, the tokenized data is used to query the one or more token tables used to tokenize the data. For instance, if a 4-digit number is tokenized by querying a token table to identify a token mapped to the 4-digit number, and the identified token is used to replace the 4-digit number to form tokenized data, then the tokenized data can be detokenized by querying the token table with the token to identify the 4-digit number mapped to the token, and the 4-digit number can be used to replace the token to form detokenized data. Similarly, in order to detokenize data, any vector modifications performed during the course of the tokenization must be reversed. For instance, if a 4-digit number is modified by a 4-digit vector using modulo addition prior to tokenization, then to detokenize the tokenized data, modulo subtraction using the 4-digit vector must be performed after detokenization.

Tokenization System Overview

FIG. 1 is a system diagram for a tokenization environment, according to one embodiment. The environment of FIG. 1 includes a front end client 100, a back end client 105, a token server 115, and a token mapper 118, communicatively coupled via a network 110. Each of the front-end client 100 and the back-end client 105 (the "clients", hereinafter) can be associated with a retailer, business, financial institution or other organization, though it should be noted that the clients can also be associated with individual users or any other suitable entity. The front-end client can receive sensitive data, for instance a credit card number or other account number during the course of a transaction with a user, and can tokenize the sensitive data using one or more single-use tokens. It should be noted that in other embodiments, the environment of FIG. 1 includes additional or different components.

The clients, the token server, and the token mapper can be computing devices capable of processing data as well as transmitting data to and receiving data from the other modules of FIG. 1 via the network 110. For example, the clients, token server, and token mapper can include a desktop computer, laptop computer, smart phone, tablet computing device, server, payment terminal, or any other device having computing and data communication capabilities. Each computing device includes one or more processors, memory, storage, and networking components. The clients, the token server, and the token mapper are coupled to the network and can interact with other modules coupled to the network using software such as a web browser or other application with communication functionality. Such software can include an interface for communicating with the other modules via the network.

The network 110 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

As noted above, the front-end client 100 is configured to receive sensitive data and to tokenize the sensitive data using one or more single-use tokens. In such an embodiment, the front-end client may be a payment terminal and the received sensitive data may be a credit card number. Accordingly, the environment of FIG. 1 can be used in the receiving, protection, and transmission of financial information, though it should be emphasized that information other than financial information can be similarly processed.

The front-end client 100 includes an interface module 120, a tokenization module 125, a tokenized data storage module 130, and a single-use token table 135. In other embodiments, the front-end client includes components other than those illustrated in FIG. 1. The interface module is configured to provide an interface between entities external to the front-end client and modules within the front-end client. The interface module can provide a graphic user interface (GUI), for instance via a front-end client display, and/or can provide a communicative interface, for instance configured to automatically route received sensitive data, vector tables, and/or token tables to modules within the front-end client. The interface module can also provide an interface for communications between modules of the front-end client, for instance by storing received single-use tokens in the single-use token table. The interface module can also receive requests for tokenized data, for instance from the back-end client 105, and can provide tokenized data to the back-end client in response.

The tokenization module 125 is configured to receive sensitive data, to tokenize a portion of the received sensitive data using one or more single-use tokens, and to store or transmit the tokenized data. In the embodiments described herein, the tokenization module performs DLT tokenization, though it should be noted that other forms of single-use tokenization can also be performed according to the principles described herein. In response to receiving the sensitive data, the tokenization module generates one or more single-use tokens, and stores the generated tokens in the single-use token table 135. In some embodiments, the tokenization module requests, via the interface module 120, one or more single-use tokens from the token server 115. Tokens received from the token server can be stored in the single-use token table. It should be noted that the single-use tokens generated by the front-end client 100 or received from the token server 115 are used only once in tokenizing sensitive data. In the event that the same sensitive data is received at a later time (for instance, the same credit card is used to make two separate purchases), different single-use tokens are generated for tokenizing the sensitive data a second time.

The tokenization module 125 can perform chained tokenization with one or more single-use tokens, and can implement various types of data modifications before or after each tokenization iteration. The tokenization module, after tokenizing the sensitive data to generate tokenized data, can store the tokenized data in the tokenized data storage module 130, or can transmit the tokenized data to an entity not shown in FIG. 1 (such as a financial institution or the like). In some embodiments, to improve security further, the single-use tokens stored in the single-use token table 135 are deleted periodically.

The back-end client 105 includes an interface module 140, an analytics module 145, a fraud module 150, and a multi-use token table 155. In other embodiments, the back-end client includes components other than those illustrated in FIG. 1. The interface module is configured to perform operations similar to the interface module 120, for instance by providing a communicative and/or user interface between the components of the embodiment of FIG. 1 and the back-end client, or between components of the back-end client itself.

The analytics module 145 is configured to enable monitoring of the use of single-use tokens by the front-end client 100 after the single-use tokens are used to tokenize data. The analytics module can be use to generate reports summarizing the activity associated with a particular token, particular sensitive data (such as a credit card number), or a particular merchant or entity associated with the front-end client 100. In some embodiments, in order to generate summary reports of activity associated with one or more tokens, the analytics module queries the token mapper 118 to identify a number of single-use tokens mapped to a multi-use token. For instance, to generate a report illustrating the number of transactions associated with a particular credit card number, the analytics module 145 can identify a multi-use token associated with the credit card number (for example, by querying the multi-use token table 155), and can query the token mapper 118 to identify single-use tokens mapped to the identified multi-use token.

The fraud module 150 is configured to enable monitoring of the use of single-use tokens by the front-end client 100 before the single-use tokens are used to tokenize data. The fraud module can access a list of sensitive data (such as credit card numbers, account numbers, and the like) associated with suspicious activity, associated with fraud detection watch lists, associated with suspicious individuals, and the like. The fraud module can subsequently generate a list of multi-use tokens (a "multi-use token watch list" hereinafter) associated with the sensitive data on the accessed list of sensitive data, for instance by querying the multi-use token table 155. When the tokenization module 125 of the front-end client generates a single-use token, the tokenization module can query the token mapper 118 to identify a multi-use token associated with the generated single-use token, and can query the fraud module to determine if the identified multi-use token is listed within the multi-use token watch list. If the generated single-use token is mapped to a multi-use token on the watch list, the front-end client 100 can prevent the tokenization operation from occurring, for instance by rejecting a transaction associated with the requested tokenization operation.

The back-end client 105 can generate multi-use token tables for storage in the multi-use token table 155, or can receive multi-use token tables from the token server 115. In some embodiments, the back-end client can receive tokenized data from the front-end client 100, and can detokenize the sensitive data, or can retokenize the sensitive data. For instance, if the back-end client receives data tokenized with a single-use token, the back-end client can query the token mapper 118 with the portion of the tokenized data including a single-use token to identify an associated multi-use token, and can replace the single-use token portion of the tokenized data with the multi-use token to create retokenized data. Such embodiments allow the back-end client to convert data tokenized within a first domain to data tokenized within a second domain.

The token server 115 is configured to provide single-use tokens to the front-end client 100, and to provide multi-use token tables to the back-end client 105. The token server can provide tokens and token tables to a client in response to a request from the client. For instance, the front-end client can request a single-use token from the token server in response to accessing sensitive data for tokenization. It should be noted that although not discussed further herein, the back-end client can be configured to receive and tokenize sensitive data. For instance, the back-end client can query a token table stored in the multi-use token table 155 with a portion of the sensitive data to identify a multi-use token, can replace the portion of the sensitive data with the identified token, and can store the resulting tokenized data at the back-end client or transmit the tokenized data to another entity.

Mapping Between Tokenization Domains

The token mapper 118 is configured to generate and/or maintain a mapping between single-use tokens used by the front-end client 100 and multi-use tokens stored by the back-end client 105 (a "token map" hereinafter). The token mapper identifies single-use tokens used by the front-end client to tokenize the same portion of sensitive data, identifies a multi-use token stored by the back-end client that is mapped to the portion of sensitive data within a multi-use token table stored at the back-end client, and stores an association (or "mapping") between the identified single-use tokens and the identified multi-use token within the token map. In other words, the token map associates one or more single-use tokens mapped to a sensitive data value and a multi-use token mapped to the same sensitive data value.

For example, for an account number "12 34567 89", the tokenization module 125 can be configured to replace the middle five digits "34567" with a first single-use five digit token "A76R2" during a first transaction, with a second single-use five digit token "M9Q00" during a second transaction, and with a third single-use five digit token "2P3W3" during a third transaction. The tokenized data resulting from the first, second, and third transactions is "12 A76R2 89", "12M9Q00 89", and "12 2P3W3 89", respectively. Continuing with this example, the multi-use token table 155 can store a token table that maps a multi-use token "UGX6V" to the value "34567". In this example, the token mapper 118 generates a token map mapping each of the single-use tokens to the multi-use token, as follows:

| Single-use token | Multi-use token |
|---|---|
| A76R2 | UGX6V |
| M9Q00 | UGX6V |
| 2P3W3 | UGX6V |

It should be noted that in some embodiments, the token tables stored by the token mapper can include any number of multi-use tokens, and any number of single-use tokens mapped to each multi-use token. As noted above, the front-end client 100 can be configured to delete stored single-use tokens periodically, or in response to any other suitable factor, such as the completion of a transaction associated with a stored single-use token.

The token mapper 118 can store the token map in a storage module (not shown in FIG. 1), or can generate the token map in response to a request, for instance from the analytics module 145 or any other entity. The token mapper can update a stored token map periodically (for instance, every 6 hours or once a day), can update a stored token map each time the front-end client 100 generates a new single-use token, or can update a stored token map each time the front-end client generates a threshold number of single-use tokens (for instance, after every 10 single-use tokens). It should be noted that if an unauthorized entity had access to the token map, the unauthorized entity would not be able to detokenize intercepted tokenized data, since the token map does not map tokens to clear text values replaced by the tokens. Accordingly, storing a token map mapping between different token domains provides the benefits offered by the token map (for instance, post-tokenization analytics and pre-tokenization fraud detection), but does not introduce additional security concerns. The generation of a token map is described in greater detail with regards to FIG. 2.

Figure 2:
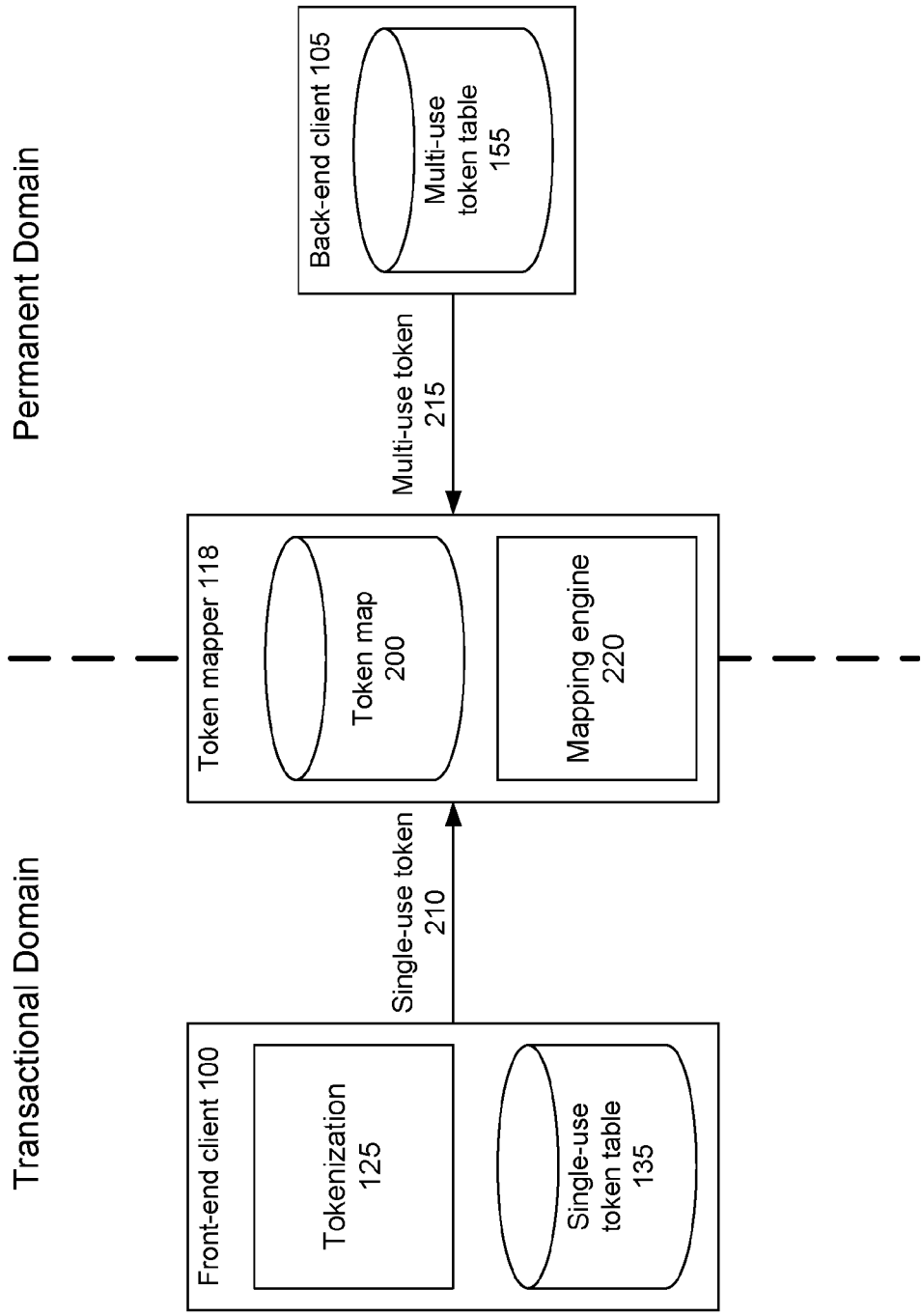
FIG. 2 is a system diagram illustrating token mapping between token domains, according to one embodiment.

FIG. 2 is a system diagram illustrating token mapping between token domains, according to one embodiment. The embodiment of FIG. 2 includes a transactional domain and a permanent domain. Systems within the transactional domain (such as the front-end client 100) use single-use tokens in tokenization operations, and systems within the permanent domain (such as the back-end client 105) use multi-use tokens in tokenization operations.

The token mapper 118 is configured to access a single-use token 210 from the front-end client 100 mapped to a data value within the single-use token table 135 and a multi-use token 215 from the back-end client 105 mapped to the same data value within the multi-use token table 155, and is configured to store an association between the access single-use token and multi-use token within the token map 200.

The token mapper 118 can request a single-use token 210 from the front-end client 100, for instance periodically or in response to being informed of the generation of a single-use token by the front-end client. The front-end client can instead be configured to automatically provide generated or received single-use tokens to the token mapper 118. Upon accessing a single-use token from the front-end client 100, the token mapper can request an associated multi-use token 215 from the back-end client 105, and the back-end client can provide the associated multi-use token in response to the request. In some embodiments, the front-end client can inform the back-end client of the generation or receipt of a single-use token, and the back-end client can be configured to automatically provide an associated multi-use token to the token mapper.

In one embodiment, in order to request a multi-use token 215 associated with a received single-use token 210 from the back-end client 105, the front-end client 100 can provide to the token mapper 118 the clear text data value to which the single-use token is mapped within the single-use token table 135. Using this provided clear text value, the token mapper 118 can query the back-end client with the clear text value, the back-end client can identify the multi-use token mapped to the clear text value within the multi-use token table, and the back-end client can provide the identified token to the token mapper.

In this embodiment, providing the clear text value associated with the single-use token 210 to the token mapper 118 may create a potential security concern, as an entity with unauthorized access to the token mapper may intercept a token and a clear text value to which the token is mapped. However, steps can be taken to increase the security of such an embodiment. For instance, the token mapper can be configured to delete the clear text value immediately after querying the back-end client 105. Further, the token mapper 118 can implement various forms of data protection to secure the clear text value, such as additional tokenization and/or encryption. Finally, the front-end client 100 can be configured to perform chained tokenization, vector modification, and other tokenization enhancements, so that even if an unauthorized entity accesses a single-use token and a clear text value to which it is mapped, the unauthorized entity would still not be able to detokenize data tokenized using the single-use tokens without having access to any additional tokens or any vectors used in the tokenization operation.

In one embodiment, the token mapper 118 can utilize an external service (not shown in FIG. 2) to identify a multi-use token 215 associated with an accessed single-use token 210. For instance, the token mapper can provide a received single-use token to an external query module, and the external query module can query the single-use token table 135 with the single-use token to identify a clear text value to which the single-use token is mapped. The external query module can then query the multi-use token table 155 with the clear text value to identify a multi-use token mapped to the clear text value, the external query module can provide the identified multi-use token to the token mapper, and the token mapper can store the association between the single-use table and the multi-use table in the token map 200.

Alternatively, the front-end client 100 can provide the single-use token 210 and the clear text value to which it is mapped within the single-use token table 135 to the external query module. The external query module can query the multi-use token table 155 with the clear text value to access a multi-use token 215 mapped to the clear text value. The external query module can then provide the single-use token and the multi-use token to the token mapper for association and storage in the token map 200.

Using an external query module allows the token mapper 118 to access an associated single-use token 210 and multi-use token 215 without accessing the clear text value to which both tokens are mapped within the single-use token table 135 and multi-use token table 155. Beneficially, by preventing the token mapper from having access to clear text values, unauthorized entities with access to the token mapper are prevented from being able to have access to the clear text value mapped to each token, and thus are prevented from detokenizing intercepted data tokenized with the tokens. In addition, the external query module does not store the association between single-use tokens and multi-use tokens, and can delete any temporarily stored tokens once the tokens are provided to the token mapper. This prevents unauthorized parties with access to the external query module from accessing the association between single-use tokens and multi-use tokens.

In one embodiment, the token mapper 118 does not store a mapping between a single-use token 210 and a multi-use token 215 in a token map 200. Instead, the token mapper includes a mapping engine 220 configured to identify a multi-use token associated with a single-use token in response to receiving the single-use token. In such embodiments, the mapping engine 220 has direct access to the single-use token table 135 and the multi-use token table 155. The mapping engine 220 can identify a clear text value to which a received single-use token is mapped by querying the single-use token table with the single-use token. The mapping engine can then query the multi-use token table with the clear text value to identify the multi-use token associated with the received single-use token, and can provide the associated tokens to, for example, the back-end client 105 for analysis. Such an embodiment beneficially prevents unauthorized parties with access to the token mapper from having access to a token map mapping single-use tokens to each of any number of multi-use tokens.

Figure 3:
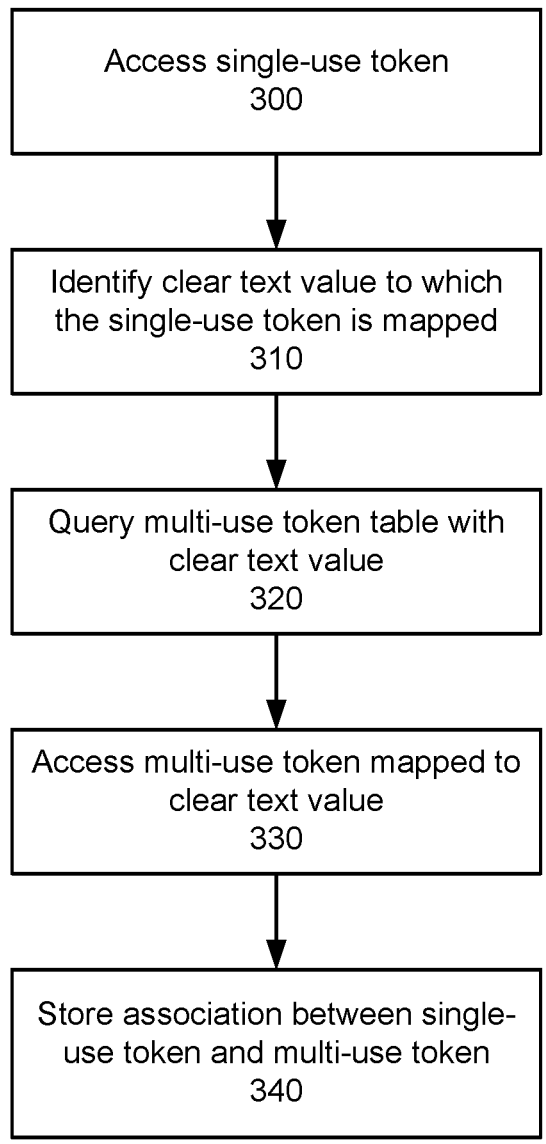
FIG. 3 is a flow chart illustrating a process of generating a token map, according to one embodiment.

FIG. 3 is a flow chart illustrating a process of generating a token map, according to one embodiment. A single-use token is accessed 300. For instance, a single-use token can be received from a tokenization system in a transactional tokenization domain that includes from a single-use token table. A clear text value to which the single-use token is mapped is identified 310. For instance, the single-use token table can be queried with the single-use token to identify the clear text value mapped to the single-use token, or the clear text value can be received from the tokenization system in the transactional domain in conjunction with the single-use token.

A multi-use token table is queried 320 with the clear text value. The multi-use token table can be part of a tokenization system in a permanent tokenization domain. A multi-use token mapped to the clear text value within the multi-use token table is accessed 330. An association between the single-use token and the multi-use token is stored 340, for instance in a token map. The clear text value can subsequently be deleted. As noted above, the token map can include, for each of any number of multi-use tokens, a mapping between any number of single-use tokens and the multi-use token.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for retokenizing data, comprising:
    accessing, by an input module of a tokenization system, tokenized data comprising data tokenized using a single-use token value such that a portion of the tokenized data comprises the single-use token value;
    accessing, by a token mapping module of the tokenization system, a tokenization domain table mapping each of a plurality of single-use token values to an associated multi-use token value, wherein for each single-use token value mapped to a multi-use token value, a single-use token table maps the single-use token value to a clear text value, and a multi-use token table maps the multi-use token value to the same clear text value;
    querying, by a tokenization engine of the tokenization system, the accessed tokenization domain table using the single-use token value to identify a multi-use token value mapped to the single-use token value;
    retokenizing, by the tokenization engine of the tokenization system, the tokenized data by replacing the portion of the tokenized data comprising the single-use token value with the multi-use token value; and
    outputting, by an output module of the tokenization system, the retokenized data to a target entity.

2. The method of claim 1, wherein the tokenized data comprises the data tokenized by generating a single-use token value, and by replacing a portion of the data with the single-use token value to create the tokenized data.

3. The method of claim 2, further comprising storing the single-use token value in the single-use token table such that the single-use token table maps the single-use token value to a value of the portion of the data value.

4. The method of claim 3, wherein the tokenization system is further configured to delete the single-use token value from the single-use token table after a pre-determined amount of time.

5. The method of claim 1, further comprising:
    accessing, by the tokenization system, second tokenized data comprising second data tokenized using a second single-use token value such that a portion of the second tokenized data comprises the second single-use token value;
    querying, by the tokenized system, the accessed tokenization domain table using the second single-use token value to identifying a second multi-use token value mapped to the second single-use token value;
    retokenizing, by the tokenization system, the second tokenized data by replacing the portion of the second tokenized data with the second multi-use token value; and outputting the retokenized second data to a second target entity.

6. The method of claim 5, wherein the second single-use token value is different than the single-use token value.

7. The method of claim 5, wherein the second target entity is the same as the target entity.

8. A tokenization system for retokenizing tokenized data, comprising:
- a non-transitory computer-readable storage medium storing executable instructions that, when executed by a processor, perform steps comprising:
  - accessing, by an input module of the tokenization system, tokenized data comprising data tokenized using a single-use token value such that a portion of the tokenized data comprises the single-use token value;
  - accessing, by a token mapping module of the tokenization system, a tokenization domain table mapping each of a plurality of single-use token values to an associated multi-use token value, wherein for each single-use token value mapped to a multi-use token value, a single-use token table maps the single-use token value to a clear text value, and a multi-use token table maps the multi-use token value to the same clear text value;
  - querying, by a tokenization engine of the tokenization system, the accessed tokenization domain table using the single-use token value to identify a multi-use token value mapped to the single-use token value;
  - retokenizing, by the tokenization engine of the tokenization system, the tokenized data by replacing the portion of the tokenized data comprising the single-use token value with the multi-use token value; and
  - outputting, by an output module of the tokenization system, the retokenized data to a target entity; and
- a hardware processor configured to execute the instructions.

9. The tokenization system of claim 8, wherein the tokenized data comprises the data tokenized by generating a single-use token value, and by replacing a portion of the data with the single-use token value to create the tokenized data.

10. The tokenization system of claim 9, wherein the single-use token value is stored in the single-use token table such that the single-use token table maps the single-use token value to a value of the portion of the data value.

11. The tokenization system of claim 10, wherein the single-use token value is deleted from the single-use token table after a pre-determined amount of time.

12. The tokenization system of claim 8, wherein the instructions, when executed by the processor, perform further steps comprising:
- accessing second tokenized data comprising second data tokenized using a second single-use token value such that a portion of the second tokenized data comprises the second single-use token value;
- querying the accessed tokenization domain table using the second single-use token value to identifying a second multi-use token value mapped to the second single-use token value;
- retokenizing the second tokenized data by replacing the portion of the second tokenized data with the second multi-use token value; and
- outputting the retokenized second data to a second target entity.

13. The tokenization system of claim 12, wherein the second single-use token value is different than the single-use token value.

14. The tokenization system of claim 12, wherein the second target entity is the same as the target entity.

15. A non-transitory computer-readable storage medium storing executable instructions that, when executed by a processor, perform steps comprising:
- accessing, by an input module of a tokenization system, tokenized data comprising data tokenized using a single-use token value such that a portion of the tokenized data comprises the single-use token value;
- accessing, by a token mapping module of the tokenization system, a tokenization domain table mapping each of a plurality of single-use token values to an associated multi-use token value, wherein for each single-use token value mapped to a multi-use token value, a single-use token table maps the single-use token value to a clear text value, and a multi-use token table maps the multi-use token value to the same clear text value;
- querying, by a tokenization engine of the tokenization system, the accessed tokenization domain table using the single-use token value to identify a multi-use token value mapped to the single-use token value;
- retokenizing, by the tokenization engine of the tokenization system, the tokenized data by replacing the portion of the tokenized data comprising the single-use token value with the multi-use token value; and
- outputting, by an output module of the tokenization system, the retokenized data to a target entity.

16. The non-transitory computer-readable storage medium of claim 15, wherein the tokenized data comprises the data tokenized by generating a single-use token value, and by replacing a portion of the data with the single-use token value to create the tokenized data.

17. The non-transitory computer-readable storage medium of claim 16, wherein the single-use token value is stored in the single-use token table such that the single-use token table maps the single-use token value to a value of the portion of the data value.

18. The non-transitory computer-readable storage medium of claim 17, wherein the single-use token value is deleted from the single-use token table after a pre-determined amount of time.

19. The non-transitory computer-readable storage medium of claim 15, wherein the instructions, when executed by the processor, perform further steps comprising:
- accessing second tokenized data comprising second data tokenized using a second single-use token value such that a portion of the second tokenized data comprises the second single-use token value;
- querying the accessed tokenization domain table using the second single-use token value to identifying a second multi-use token value mapped to the second single-use token value;
- retokenizing the second tokenized data by replacing the portion of the second tokenized data with the second multi-use token value; and
- outputting the retokenized second data to a second target entity.

20. The non-transitory computer-readable storage medium of claim 19, wherein the second single-use token value is different than the single-use token value.

* * * * *